(12) United States Patent
Glen (10) Patent No.: US 8,037,370 B2
(45) Date of Patent: Oct. 11, 2011

(54) DATA TRANSMISSION APPARATUS WITH INFORMATION SKEW AND REDUNDANT CONTROL INFORMATION AND METHOD

(75) Inventor: David I. J. Glen, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 504 days.

(21) Appl. No.: 11/743,479

(22) Filed: May 2, 2007

(65) Prior Publication Data

US 2008/0273602 A1    Nov. 6, 2008

(51) Int. Cl.
  *G11B 20/20*  (2006.01)
  *G11B 20/24*  (2006.01)
(52) U.S. Cl. ........................... 714/700; 714/746
(58) Field of Classification Search .................. None
  See application file for complete search history.

(56) References Cited

U.S. PATENT DOCUMENTS

| | | | | |
|---|---|---|---|---|
| 3,755,628 A * | 8/1973 | Games et al. | ........ | 370/445 |
| 4,117,448 A * | 9/1978 | Siems | ........ | 367/79 |
| 4,179,657 A * | 12/1979 | Hobbs | ........ | 380/34 |
| 5,311,311 A * | 5/1994 | Harigai et al. | ........ | 348/476 |
| 5,446,914 A * | 8/1995 | Paul et al. | ........ | 709/235 |
| 5,757,416 A * | 5/1998 | Birch et al. | ........ | 725/144 |
| 5,781,056 A * | 7/1998 | Fujii | ........ | 327/276 |
| 5,917,461 A * | 6/1999 | Sakami et al. | ........ | 345/29 |
| 6,654,897 B1 * | 11/2003 | Dreps et al. | ........ | 713/401 |
| 6,724,819 B1 | 4/2004 | Takaki et al. | ........ | 375/240.12 |
| 7,072,291 B1 * | 7/2006 | Jagadeesan et al. | ........ | 370/216 |
| 7,095,778 B2 * | 8/2006 | Okubo et al. | ........ | 375/130 |
| 2002/0029355 A1 * | 3/2002 | Sakamoto et al. | ........ | 713/503 |
| 2002/0150276 A1 * | 10/2002 | Chang | ........ | 382/100 |
| 2002/0191719 A1 * | 12/2002 | Hasako et al. | ........ | 375/346 |
| 2006/0256768 A1 * | 11/2006 | Chan | ........ | 370/351 |
| 2007/0046335 A1 * | 3/2007 | Becker et al. | ........ | 326/93 |

FOREIGN PATENT DOCUMENTS

| | | |
|---|---|---|
| EP | 0936782 A2 | 8/1999 |
| WO | 01/43440 A1 | 6/2001 |

OTHER PUBLICATIONS

International Search Report from Canadian Patent Office; International Application No. PCT/CA2008/000838; dated Aug. 12, 2008; pp. 1-11.
Glen, David; Statement Supplementary Information Disclosure Statement including Exhibit A attaching slides presented on a screen from his presentation at the Society of Information Display Second America's Display Engineering and Applications Conference and Exhibition (ADEAC) held Oct. 24-27, 2009; dated Feb. 24-27, 2011.

\* cited by examiner

*Primary Examiner* — Jeffrey A Gaffin
*Assistant Examiner* — Dipakkumar Gandhi
(74) *Attorney, Agent, or Firm* — Vedder Price P.C.

(57) ABSTRACT

Apparatus and methods provide at least redundant control information such as control symbols and control data over respective channels, such as differential lanes, and skew at least the redundant control information in time between the plurality of transmission circuits. Non-control information such as video and/or audio data may also be skewed. Corresponding receiver circuits and methods are also disclosed.

30 Claims, 5 Drawing Sheets

DATA TRANSMISSION APPARATUS WITH INFORMATION SKEW AND REDUNDANT CONTROL INFORMATION AND METHOD

FIELD OF THE INVENTION

The invention relates generally to communication links and associated circuits and more particularly to data communication links and circuits and associated methods that use a plurality of channels for communicating information from a transmitter to a receiver.

BACKGROUND OF THE INVENTION

Differential data communication systems are known that employ, for example, a plurality of differential lane transmission circuits and corresponding receiver circuits. One proposed differential data communication system utilizes multiple differential lanes to communicate video and/or audio information. It has been proposed that control symbols be used for data such as video into display frame information. For each scan line, for example, a blanking start (BS) control symbol is sent that indicates, for example, where the last video data transfer unit ends. Data is sent as transfer units (micropackets). Blanking end (BE) information indicates where the first video data transfer unit begins for a display line, fill start information indicates where dummy data symbols start in each transfer unit and fill end and other symbols are also utilized. The blank end (BE) codes and control data were proposed to be sent on all lanes at the same time. For burst noise, these control codes could be all corrupted simultaneously. Control data is also sent as part of every frame, sent in a given lane and follows the blanking start (BS) information. Such blanking start information as noted above, indicates, for example, the end of a scan line. Control data includes, for example, information regarding video and audio and timing information, such as display frame, field or scan line information and related timing information. As such, redundant control symbols and control data is sent over multiple lanes. The last symbol time for a line of pixel data is followed by the control symbol BS which is inserted on all lanes of the link. Redundant information was proposed to be sent in the same time slot across all lanes to facilitate, for example, redundancy across multiple lanes.

However, since the control symbols such as blanking start information and control data, is communicated at the same time across multiple lanes, if environmental noise occurs, there may be bit errors in all lanes so the receiver may have difficulty recovering the 0information for display.

Accordingly, it would be desirable to have an improved differential data communication system.

BRIEF DESCRIPTION OF THE DRAWINGS

The invention will be more readily understood in view of the following description when accompanied by the below figures and wherein like reference numerals represent like elements, wherein.

DETAILED DESCRIPTION OF THE PREFERRED EMBODIMENTS

Briefly, apparatus and methods are disclosed that provide redundant control information such as, but not limited to, control symbols and/or control data over respective channels such as differential lanes, wireless channels, optical channels or any suitable channels, and time skew at least the redundant control information in time between the plurality of transmission circuits. Non-control information such as video and/or audio data may also be skewed. Corresponding methods are also disclosed. In addition, a receiving circuit is disclosed that employs a plurality of receiver circuits that receive redundant control symbols and/or control data over respective channels. The circuit is operative to de-skew the redundant control symbols and/or the control data in time between the plurality of receiver circuits.

Among other advantages, the apparatus and methods skew (and de-skew) redundant control information in time over multiple channels to provide improved the communication of information over communication links. In the event of environmental noise or other data corruption sources, the time skewing and redundant information can offer a more robust data link. The information is redundant and skewed over multiple channels. If environmental noise or other error causing sources corrupt one lane, for example, not all lanes are affected in the same way so that data can be more easily and accurately recovered. As such, a connector cable, or wireless link for example, and corresponding transmission/receiver communication system may have increased immunity against external noise or other corruption sources. Other advantages will be recognized by those of ordinary skill in the art.

In one example, among other information, the blank end codes are distributed in time as well as across lanes. As such, for burst noise, if one blank end code is corrupted, it is less likely that all of the blank end codes are not corrupted. This can improve the robustness for information transmission across buses that employ differential transmitters and receivers. Also, if the information is communicated over a wireless multi-channels (whether different frequencies or different codes or other channels), optical channels, the above scheme may provide improved error correction and noise robustness.

A device is also disclosed, that may include a display, a differential receiving circuit and video processing circuitry. The differential receiving circuit may include a plurality of differential lane receiver circuits that receive the redundant control symbols and control data over respective differential lanes and de-skews the redundant control symbols and control data in time between the plurality of differential lane transmission circuits. The differential receiving circuit is also operative to receive time skewed video data packed with the redundant control symbols and control data. The video processing circuit generates pixels for display on the display from de-skewed video data packed with the redundant control symbols and control data.

A differential data transmission circuit includes a video stream processing circuit that is operative to deserialize a video data stream for communication over a plurality of differential lane transmission circuits. A plurality of differential lane transmission circuits that provide redundant frame control symbols and control data over respective differential lanes and skew the redundant control symbols and control data in time between the plurality of differential lane transmission circuits.

In one example, time skewing is provided by delay circuits interposed in respective transmission lanes. De-skewing is provided by delay elements (e.g., one or more flops) provided on the receiving end in different lanes to offset delays caused on the transmitting end. However, it will be recognized that any suitable skewing and de-skewing structure may also be employed.

Figure 1:
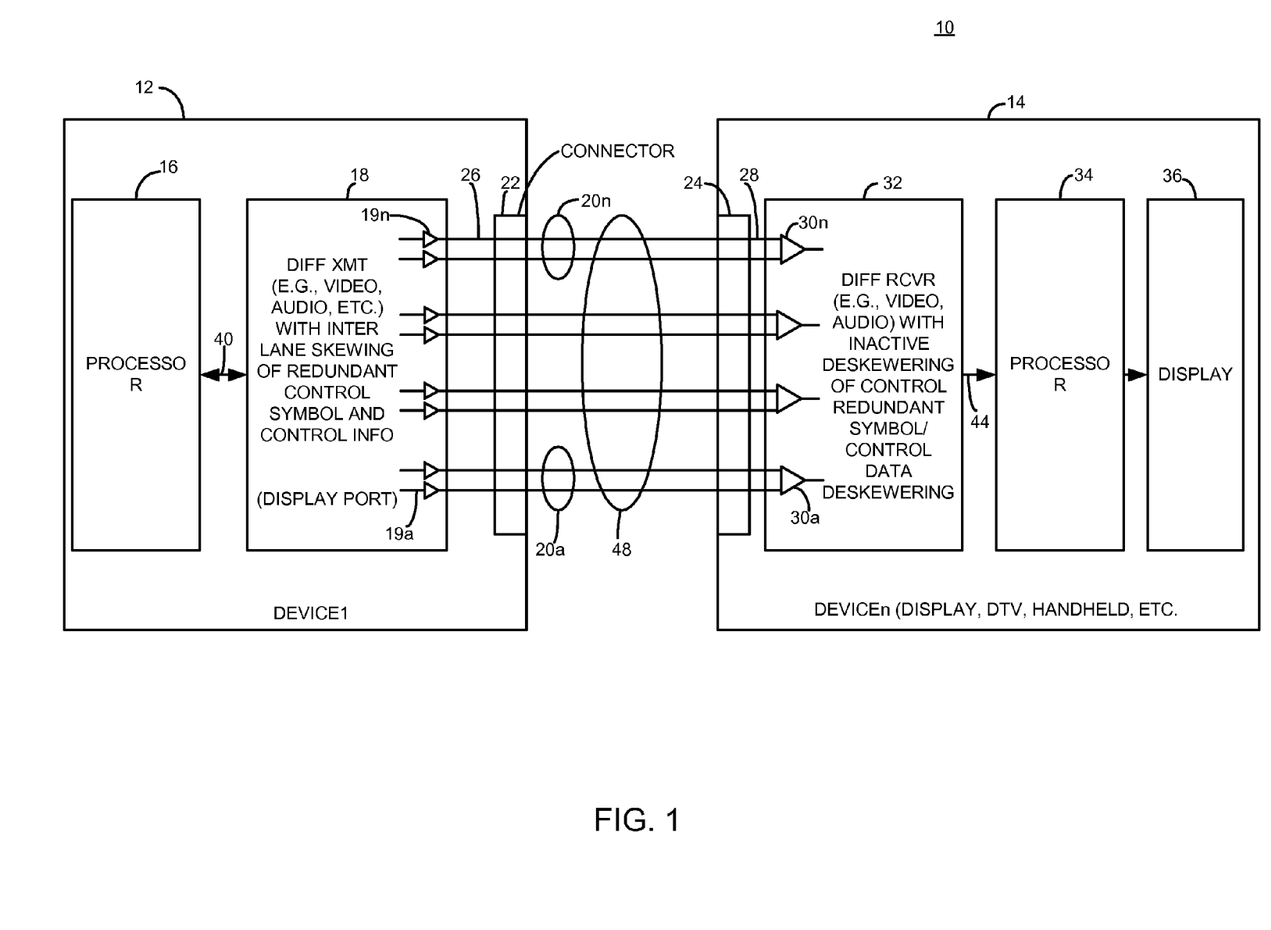
FIG. 1 is a block diagram illustrating one example of a system that employs differential transmitters and differential receivers wherein the differential transmitter, for example, employs interlane skewing of redundant control symbol and control information in accordance with one embodiment of the invention.

FIG. 1 illustrates one example of a system 10 that includes a first device 12 such as a video and/or audio source device that provides a source of audio and/or video or other suitable information to be communicated to a second device 14, such as a LCD display, digital television, handheld device, or any other suitable device operative to receive the information communicated by the device 12. The first device includes circuitry, such as one or more processors 16 or discrete logic coupled to a differential transmitter 18 of the type compliant with, for example, the DisplayPort™ standard, or any other suitable differential transmitter circuit, and in this example provides redundant control symbols, control data and video and/or audio data over a plurality of respective differential lanes 20a-20n.

Generally, the DisplayPort™ standard defines a digital display interface standard that may connect, for example, a video and/or audio source device and its corresponding display monitor. For example, one or more video sources and corresponding display monitors may be connected via the DisplayPort™ communication interface in a home theater system, computer system or any other suitable system. A DisplayPort™ connector may support 1 to 4 data pairs that also carry audio and clock signals with transfer rates of, for example, 1.62 or 2.7 gigabits per second. A bi-directional auxiliary channel runs at a constant 1 megabit per second rate and serves as a main link management and device control using VESA EDID and VESA MCCS standards. A single cable may be used to support, for example, 10 gigabit per second forward link channel high resolution monitors for high definition video. A DisplayPort™ connection may consist of, for example, three components in a physical layer such as the main link, the auxiliary channel and the hot plug detect signal line. The hot plug detect signal line only carries data in one direction, from the sink device (receiving device) to the source device (transmitting device). When a user connects devices using a DisplayPort™ communication interface, the hot plug detect signal is used in the initiation of the exchange of data. The hot plug detect can also be used as an interrupt line to allow the receiver to get the attention of the transmitter.

The auxiliary channel offers bi-directional data signals with a 1 megabit per second data rate and data sent over this channel is involved in managing the link and device control. The main link lanes (differential/data pairs) may be used to send different speeds of information (e.g., video/audio) depending upon the quality of the connecting cable and the capabilities of the source and receiving devices. However, the same speed is used for all lanes once designated. Devices can use, for example, 1, 2 or 4 lanes. The transmission speeds and a number of lanes in use may depend on the needs of the display. The main link can carry data in only one direction from source to sink. It also supports an optional HDCP content protection system for viewing HDTV, video and other protected content. The DisplayPort™ system is a digital display interface and in the main link, each lane is a differential pair. The source serves as a master and the auxiliary channel is used to program the mode of the DisplayPort™ receivers to 1, 2 or 4 lanes along with link speeds and color depths. The source device can read a register, for example, in a sink device and configure the main link using this information. The main link utilizes encoding which, for example, translates an 8 bit byte to a 10 bit code and there may be, for example, 1,024 10 bit codes but only 256 data codes may be validated codes. There are also 10 or so command codes. Data symbols and control symbols are sent as part of the communication protocol. Details of one example of a DisplayPort™ proposal may be found, for example, in the DisplayPort™ Spec 1.0 incorporated herein by reference.

The differential transmitter 18 skews redundant control symbols and control data in time between the plurality of differential lane transmission circuits identified as 19a-19n. The differential lanes 20a-20n may be grouped into a cable having, for example, a connector 22 and connector 24. The connectors are electrically coupled to differential transmitter circuits and differential receiver circuits through suitable connections 26 and 28 as known in the art.

The device 12 may be any suitable device including, but not limited to, a laptop computer, desktop computer, cell phone, digital audio player, digital video player, such as but not limited to, DVD players, CD ROM players, cable TV card, satellite TV card, or any other suitable device that provides audio and/or video data or any other suitable data as desired, that is communicated to the device 14.

The device 14 includes a corresponding plurality of differential lane receiver circuits 30a-30n that receive transmitted redundant control symbols, control data and in this example, video and/or analog data over respective differential lanes 20a-20n. The plurality of differential lane receiver circuits 30a-30n may be part of a differential receiving circuit 32 that is operative to de-skew the redundant control symbols, control data and video and/or analog information, in time, between the plurality of differential lane transmission circuits 19a-19n. The video data may be packed with the redundant control symbols and control data.

Although not shown, the device 12 may also include a differential receiver circuit 32 so that it serves as a transceiver. Also the device 14 may, if desired include a differential transmission circuit 18 if desired.

The device 14 includes circuitry such as one or more processors 34 operatively coupled to the plurality of differential lane receiver circuits 30a-30n for receiving the de-skewed information and to produce pixel information for display on the display 36. The processor 16 and 34 may be any suitable processing device including, but not limited to, one or more DSPs, CPUs, graphics processor cores, other application specific integrated circuits, or any other suitable processing circuits whether implemented as discrete logic circuits, software executing by a processor or any suitable structure. The display 36 may be, for example, an LCD display or any other suitable display in this example.

Figure 2:
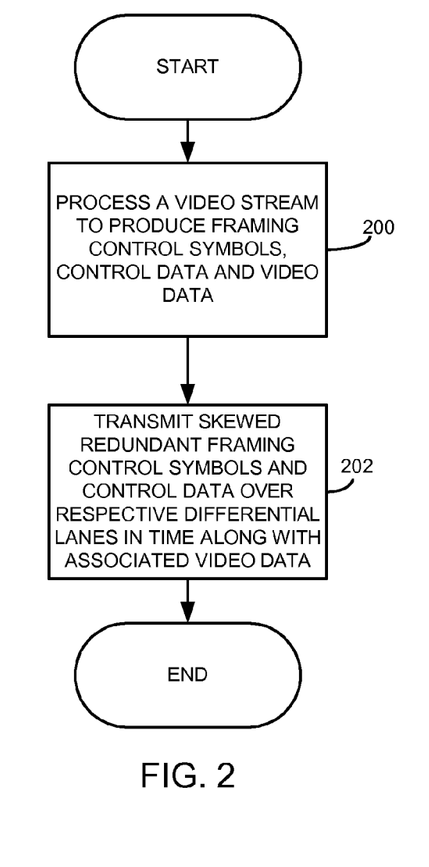
FIG. 2 is a flowchart illustrating one example of a method for processing video in accordance with one embodiment of the invention.
Figure 3:
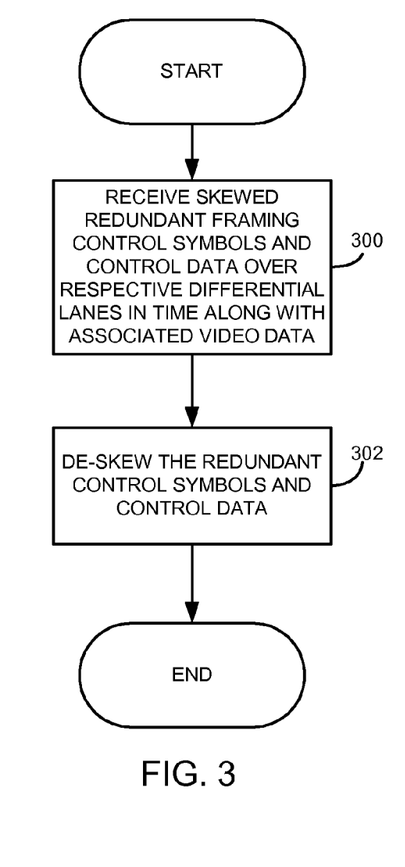
FIG. 3 is a flowchart illustrating one example of a method for processing video in accordance with one embodiment of the invention.

Referring also to FIGS. 2 and 3, FIG. 2 illustrates one example of a method for processing video that may be carried out, for example, by the device 12, or any other suitable structure. As shown, the method includes processing a video stream to produce control symbols, control data, video data and/or corresponding audio data, if desired, as shown in block 200. This may be done, for example, in accordance with the DisplayPort™ standard, or according to any other desired protocol or scheme as desired.

As shown in block 202, the method includes transmitting at least skewed redundant control symbols and/or control data over respective differential lanes in time along with associated video data and/or audio data. As such, the processor 16 may process the video stream to produce the control symbols, control data and video data identified as being communicated over communication link or bus 48. The differential transmitter 18 may then transmit the skewed redundant control symbols and control data over respective differential lanes 19a-19n in time along with associated video data to the sink or receiving device 14.

FIG. 3 illustrates operation of the receiving device 14. In operation, as shown in block 300, the method may include receiving skewed redundant control symbols and control data over respective differential lanes 20a-20n in time along with associated video data from the differential transmitter 18. The differential receiver 32, or any other suitable structure may then de-skew the received skewed redundant control symbol and control data information as shown in block 302 and pass it to processor 34 via suitable bus 44. The processor 34 or differential receiver 32 may then perform redundant information based error detection and recovery as further discussed with reference to FIG. 6. The processor may then suitably format the pixel information and display it on display 36. It will be recognized that the order of the operations described above may be done in any suitable order and that the operations may be performed repeatedly as needed to communicate information over the differential communication link 48 as desired.

Figure 4:
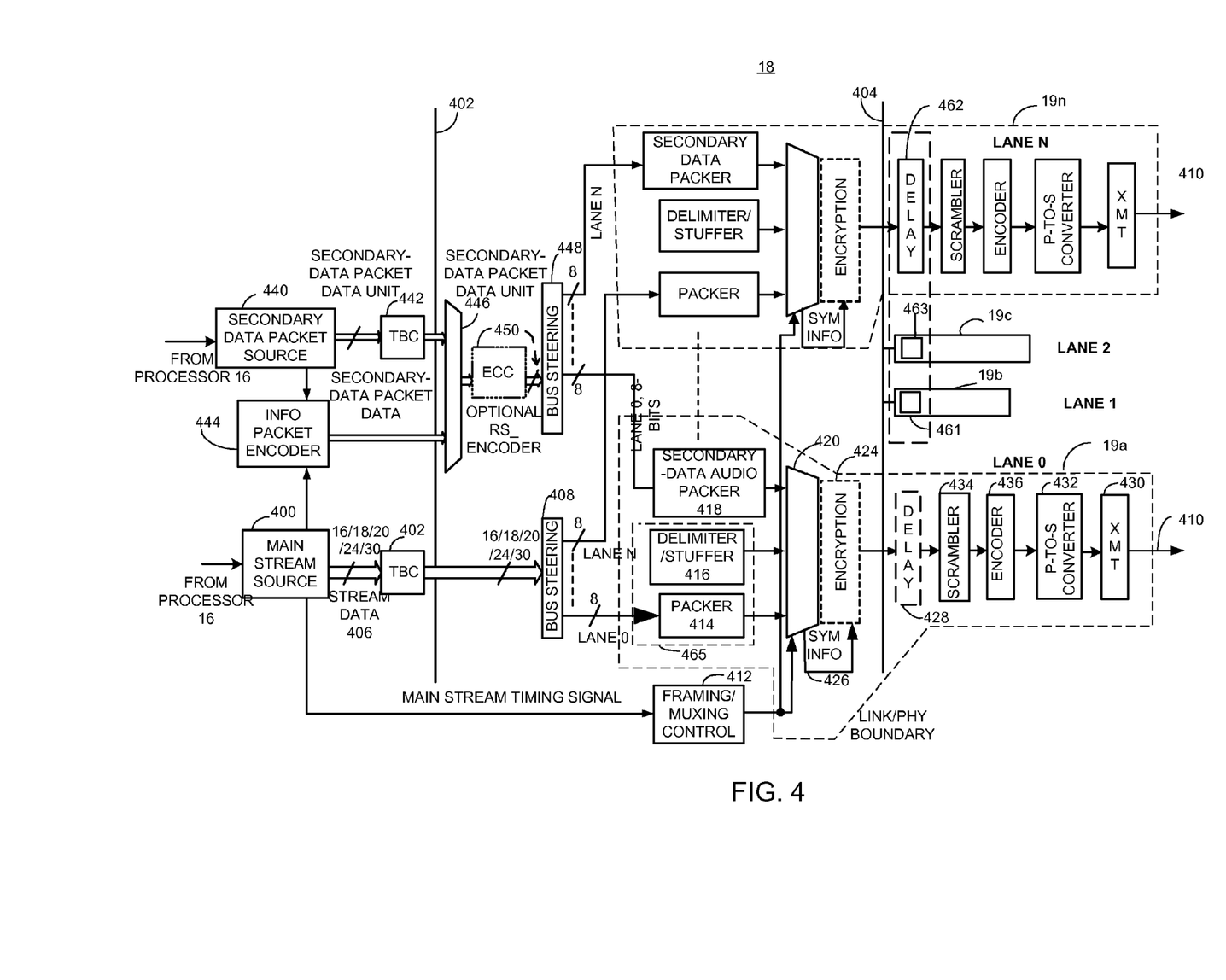
FIG. 4 is a block diagram illustrating one example of a differential data transmission circuit in accordance with one embodiment of the invention.

FIG. 4 is a block diagram illustrating one example of a differential data transmission circuit 18 with interlane skewing of redundant control symbol and control information. As shown in the this example, the differential data transmission circuit 18 includes a mainstream source communication path that, for example, receives mainstream information from processor 16. A mainstream source block 400 sends control information to information packet encoder and the framing/muxing controller, such as vertical blank start and end, horizontal blank start and end, frame timing information and other suitable information as needed. The source block 400 also provides stream data to a time base converter unit 402 to convert the information from a native stream clock domain to a transmitter clock domain as shown by line 402. Line 404 designates the link and physical boundary for purposes of illustration. The stream data 406 may include, for example, pixel information for display on a display, or any other suitable information. The time base converter outputs the data in a suitable timing configuration to bus steering logic 408 which passes the data stream to one or more lanes 20a-20n via corresponding differential lane transmission circuits 19a-19n. Each differential lane transmission circuit provides control symbols and control data 410 over respective differential lanes. Video data is also communicated over the same lanes in a skewed manner as further described with reference to FIG. 5.

For purposes of illustration, a single differential lane transmission circuit will be described but it will be recognized that the circuitry may be suitably shared or duplicated as desired to provide the requisite functionality. As shown for example with respect to lane 0, the differential lane transmission circuit 19a includes muxing control logic 412 that receives mainstream video timing information, e.g., stream rate, video timing information, from the mainstream source block 400. The differential lane transmission circuit may also include a data packer 414, a delimiter/dummy data stuffer 416 and a secondary data audio packer 418. A multiplexer 420 is controlled by suitable control information 422 from the muxing control circuit 412 to output packed data from the packer 414, dummy data or delimiting information from delimiter/stuffer 416 or audio packets from audio packer 418. If desired, an encryption block 424 may also be employed utilizing system information 426.

The differential lane transmission circuit 19a also includes a lane skewing circuit 428 which in this example, includes a delay stage such as a flop or one or more transistors or any other suitable delay structure that delays information output from the multiplexer 420 to a transmit stage 430 associated with each respective lane. The delay stage 428 is interposed in line prior to a per-lane parallel to serial conversion stage 432 and in this example, prior to a scrambler 434 and encoder 436. However, it will be recognized that it may be positioned at any suitable location. The delay stage 428 skews redundant control symbols and control data (redundant across lanes) in time between the plurality of differential lane transmission circuits 19a-19n. The delay stage 428 is interposed in line prior to a per-lane parallel to serial conversion stage with respect to an adjacent lane. As such, each adjacent lane has a time offset or delay associated with it with respect to an adjacent lane. In this example, the differential lane transmission circuit 19a and other transmission circuits through 19n insert a skew of, for example, two clock cycles between adjacent lanes. However, any suitable delay may be utilized. In addition, some of the lanes may not include a delay stage but the adjacent lanes each include delay stages so there is an offset or skew in time among transmission of information across the plurality of lanes. For example, delay stage 428 may not be necessary if delay stages are placed in the other lanes.

Another path, if desired, takes care of secondary data packet such as audio packets from processor 16 via a secondary data packet source block 440. The secondary data packet source block 440 controls audio format, sample rate and coordinates and other aspects of the audio data stream configuration. A time base converter 440 converts the secondary data packet data to a corresponding time domain and the information both from the mainstream source and the secondary data packet source 400 and 440 are passed to an information packet encoder 444. A multiplexer 443 selects information from the information packet encoder 444 or the secondary data packet or the time corrected information and passes to bus steering logic 448 which passes the secondary data information to the plurality of lanes. Accordingly, the secondary data audio packer 418 is coupled to the bus steering logic 448 and corresponding logic in each of the differential lane transmission circuits is also provided. If desired, an optional encoder 450 may also be employed between the multiplexer 443 and bus steering logic 448 utilizing, for example, error correction codes as known in the art. As also known in the art, the transmitters 430 are differential signaling transmitters.

As also shown, a lane skewing circuit 461 includes a delay stage interposed in line in at least one of a plurality of differential lane transmission circuits 19b and the second delay stage 462 interposed in line in another of the plurality of differential lane transmission circuits such as circuit 19n and the first and second delay stages produce different delays with respect to each of the lanes of redundant control symbols and control data, in time. In one example, delay stage 462 may introduce a six clock cycle delay with respect to lane 0, wherein other intervening transmitter circuits (assuming four lanes) would introduce a two clock and four clock delay with respect to lane 0. Alternatively, lane 0 may include a non zero delay and each of the other lanes may include an offset in time with respect to lane 0 to provide a skewing in time of information being transmitted across the lanes.

The differential data transmission circuit 18 includes a data packing circuit 465 that outputs video control symbols, control data and associated packets of video data for the differential lane transmission circuit 19a. Additional delimiters and packers may be employed for each lane to provide a plurality of differential lane transmission circuits. The bus steering logic 408 serves as a video stream processing circuit that deserializes a video data stream for communication over a plurality of differential lane transmission circuits. The delay circuit 462 and other delay circuits, for example, associated with differential lane transmission circuits 19b and 19c shown as, for example, delay stage 463 and 461 are each associated with a different differential lane transmission circuit 19n-19a, for example, and are operative to skew, such as delay, redundant control symbols and control data in time between the plurality of differential lane transmission circuits.

As noted above, control symbols may include, for example, data representing a last active pixel during a vertical display period (BS), and a first active pixel of a line during a vertical display period (BE) and the control data may include data representing, for example, whether a video stream is in a vertical display period, or vertical blanking period, whether a video stream is an odd or even field for interlaced video, or other suitable information.

Figure 5:
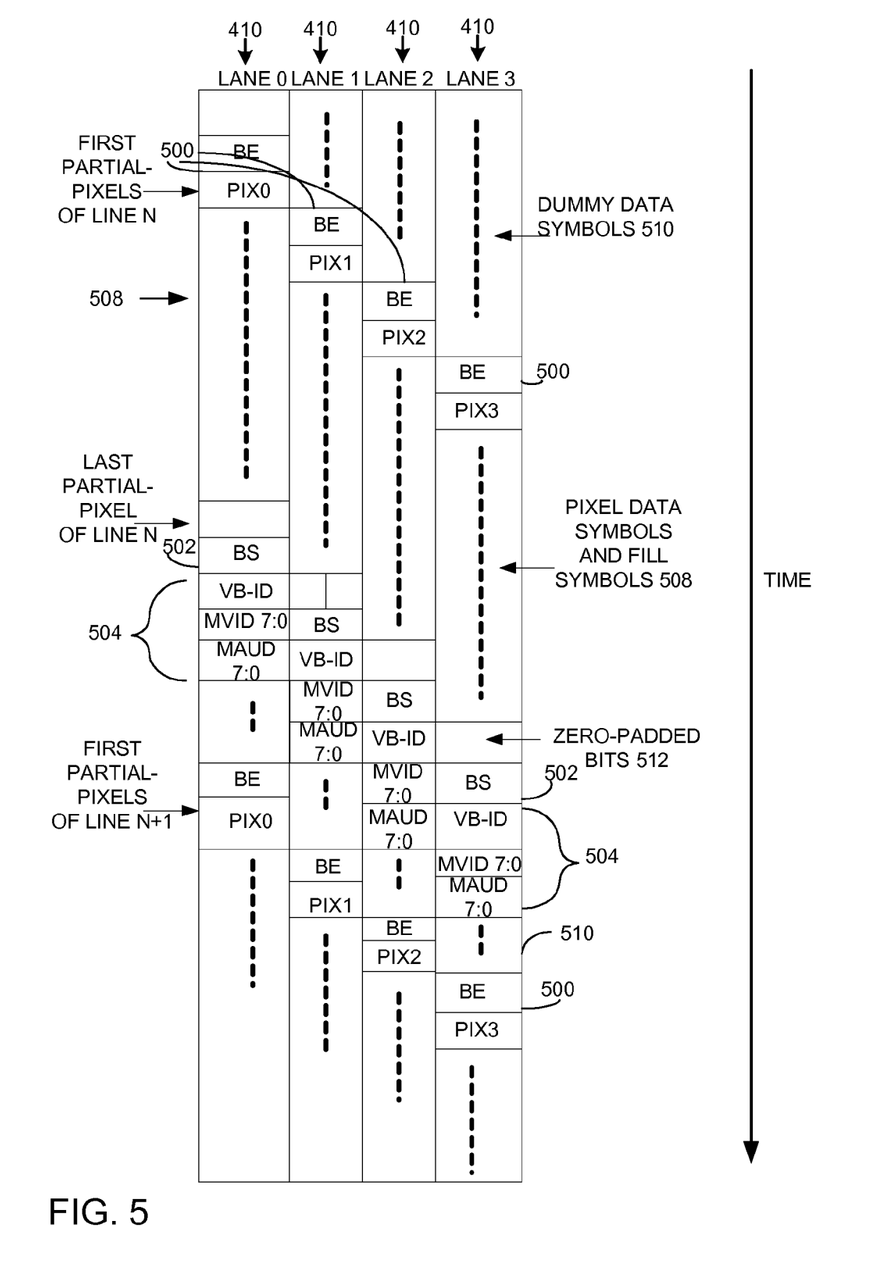
FIG. 5 is a diagram illustrating pictorially, interlane skewing of redundant control symbol and control information in accordance with one embodiment of the invention.

Referring also to FIG. 5, the diagram illustrates redundant control symbols and control data 410 that is skewed in time between a plurality of differential lane transmission circuits. As shown, redundant control symbols 500 and 502 are skewed in time between the plurality of differential lane transmission circuits and redundant control data 504 also skewed in time between the plurality of differential lane transmission circuits. In this example, video data 508 is communicated between the control symbols 500 and 502. The video data in this example is not redundant across the multiple lanes but could be if desired. The information shown as pixel information 508 in this example includes both data symbols and fill symbols to fill transmission units so that across multiple lanes an entire display line of video is sent. In addition, zero padded bits 512 may also be included as part of information between control symbols 500 and 502. In this example, the control data 504 is always sent after the BS or control symbol 502 as part of the structure. A new scan line is indicated by a following control symbol 500. By way of example, when no audio stream is transported, the MAUD 7:0 may be set to 00H. When there is no video stream transported, for example, the MVID 7:0 may be set to 00H. During the last symbol time for a line of pixel data, there may be insufficient pixel data to provide data on all lanes of a link. The transmitter then sends zeros for those bits (also referred to as zero padded bits 512). Immediately following a last symbol period for a line of data the control symbol, BS is inserted on all lanes of the link but in an offset manner. The receiver, knowing the number of active pixels per horizontal line first display, discards zero padded bits as "don't care" bits. Operational features of one example of a suitable communication interface, such as the DisplayPort™ standard may be found in the DisplayPort™ 1.0 standard incorporated herein by reference. Any other suitable communication protocol may also be employed as desired.

One example of the control data as shown as VB-ID which indicates, for example, whether a main video stream is in a vertical display period or vertical blanking period, whether a main video stream is an odd field or even field for interlaced video, whether the main video stream is interlaced or non-interlaced, or whether to mute the audio channel, or any other suitable information. M for the control data represents a time base recovery value for a video stream. Also, instead of using an inline delay element configuration to cause time skewing among channels, the and control mux logic 412 can be configured to provide skewed information among channels if desired.

Also, the lane skewing circuits may also be programmable delay circuits that produce different delays for the redundant control symbols and control data in time among adjacent lanes by utilizing a selectable array of delay stages or any suitable programmable delay circuit configuration that may be register based or non-register based as known in the art.

Since the information being transmitted across each of the lanes is skewed in time among adjacent lanes, and the redundant information such as the redundant control symbols and control data are sent if a more robust communication link and interface is provided, among other advantages, in the event of noise corruption or any other data corruption condition.

Figure 6:
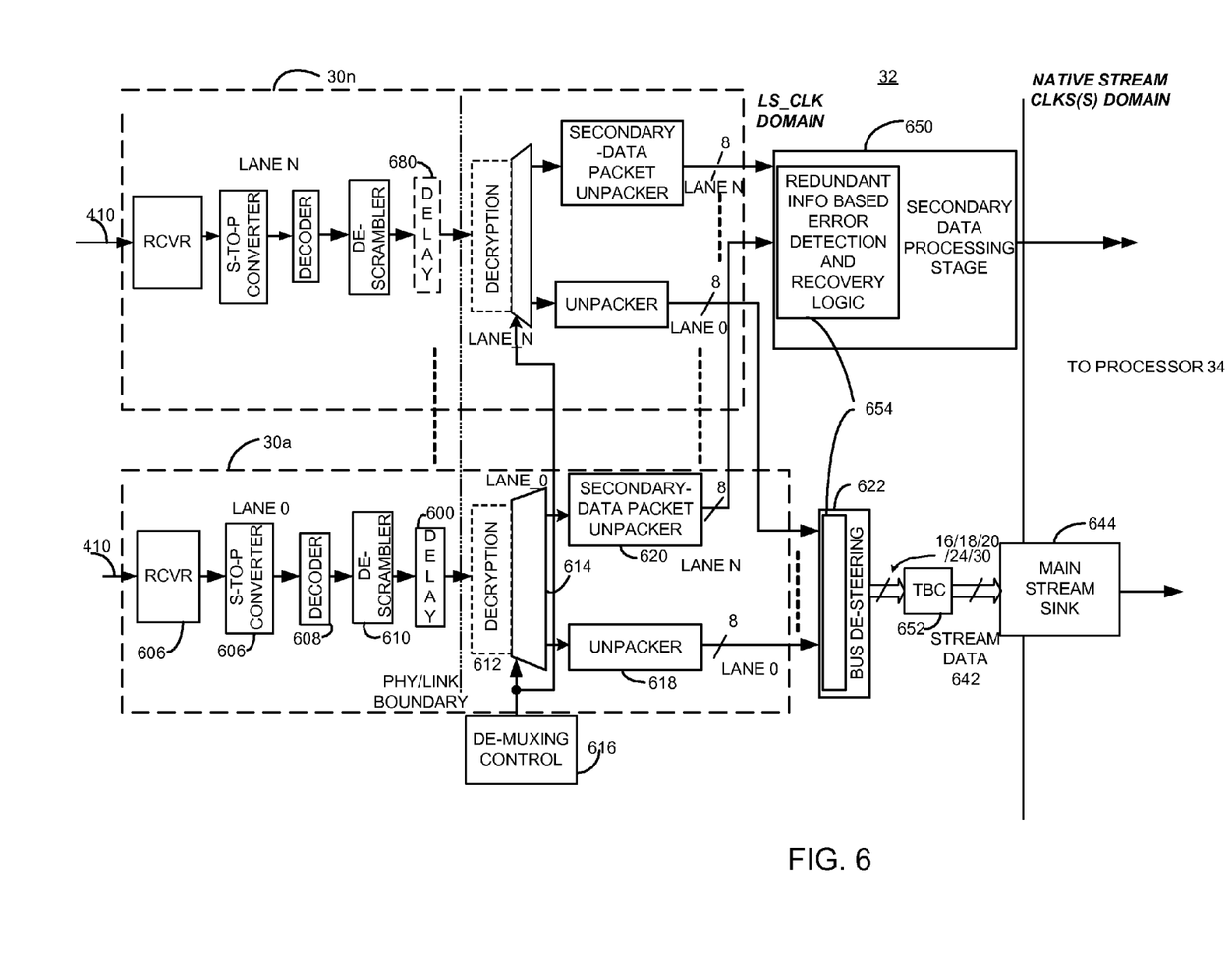
FIG. 6 is one example of a differential data receiver circuit in accordance with one embodiment of the invention.

FIG. 6 illustrates one example of a corresponding differential receiving circuit 32 having differential lane receiver circuits 30a and 30n corresponding to differential data transmission circuits 19a-19n. The differential receiving circuit 32 includes the plurality of differential lane receiver circuits 30a-30n that each receive redundant control symbols and control data over respective differential lanes and to the extent necessary, de-skew the redundant control symbols and control data, and sent video data, in time between the plurality of differential lane receiver circuits. This may be done by employing in appropriate differential lane receiver circuits, corresponding inverse delay circuits. As shown, if there is a six clock signal delay between lanes 0 and n on the transmit side (assuming four lanes and no delay in lane 0) then the differential lane receiver circuit 30n need not include a delay stage but differential lane receiver circuit 30a may include a six cycle delay stage 600 so that the corresponding unpacker circuits 618 and 620 and other circuitry obtains the suitable information at the appropriate time to output a display frame or display frames on a display.

As shown, a lane de-skewing circuit 600 includes a delay stage interposed in line after a per-lane serial to parallel conversion stage 606. In this example, lane 1 or differential lane receiver circuit 30b (not shown) would also include a delay stage so that it produces a different delay of redundant control symbols and control data in time with respect to the differential lane receiver circuit 30a and 30c (also not shown). Such circuits are not shown as they may be configured similarly as shown in FIG. 6. As such, the receiver side operates in an opposite or inverse manner with respect to removal of delay of the transmitted information in order to suitably process the received information. As noted above, the lane de-skewing circuits associated with each of the respective differential lane receiver circuits may be programmable and non-programmable as desired to correspond to delays introduced on corresponding lanes.

As shown, differential data receiving circuit 30a includes a receiver stage 604 that receives the skewed redundant control symbols and control data 410 and also includes a serial to parallel converter 606, decoder 608, descrambler 610 a decryption block 612 if desired, demultiplexer 614, demuxing control circuit 616, unpacker 618 and secondary packet unpacker 620. Bus steering logic 622 receives unpacked video data and passes it as stream data 624 to mainstream sink circuit 644 for display or other processing by processor 34. Mainstream sink circuit 644 interfaces to the receiving logic and generates video stream control signals such as blanking information and horizontal and vertical synchronization information. Similar operations are performed in the other differential data receiving circuits and secondary data (such as audio data) is processed by processing block 650 to produce secondary data 652 for output to the processor 34. As recognized, the processing block 650 may take any suitable form and decode secondary packet data for output to processor 34. A time base recover unit 652 may also be employed if desired. Receiver 30n is shown to include a delay state 680 that may be used if the transmitter delay stage 428 is employed.

The redundant information based error correction and recovery logic 654 analyzes the redundant information across lanes. In order to improve robustness to errors on the link, the receiver can compare the de-skewed control symbols on multiple lanes to see if they all match. If the redundant control symbols do not all match, then the receiver can employ error recovery methods such as voting logic or decide how to proceed based on the expected context. For example in video streams the relative timing of the BS and BE control symbols is relatively predictable. If at least one lane gets such a control symbol in approximately the right time slot, then it could be assumed to be valid for all lanes. However if a control symbol comes at a very unexpected time on only one of the lanes, then it could be assumed to be invalid. However if 3 or 4 control symbols that match arrive at an unexpected time, the receiver may decide this is valid control symbol that indicates a change in the expected video timing. Many other methods of error recovery could be employed as recognized by the skilled in the art. For control data the redundancy across multiple lanes can also be used in very similar error detection and recovery systems as described above for control symbols.

In the two lane mode of DisplayPort control symbols are sent twice on each lane, with the same two symbol period skew between lanes. This means the error detection and recovery system will always expect four control symbols whether operating in four lane or two lane mode. This permits a similar level of robustness in two lane mode as available in four lane mode.

As noted above, transmitter circuits and corresponding receiver circuits that employ different channel types other than differential signaling are also contemplated. For example a wireless channel can be used to communicate audio and video using the redundant information and time skewing operations described herein. A plurality of receiver circuits that receive redundant control information over respective channels and operative to de-skew the redundant control information in time between the plurality of receiver circuits may be used. Likewise, a data transmission circuit includes a plurality of transmission circuits operative to provide redundant control information over respective channels and operative to skew the redundant control information in time between the plurality of transmission circuits.

Among other advantages, transmitting time skewed control information and/other information may increase the robustness of a video display link, or any other suitable link. The skewing of redundant control information over multiple lanes can afford improved resilience to corruption due to noise or other factors. The disclosed receivers also include the corresponding lane delays to get synchronization of the received information to the receiver so that the receiver can suitably process the skewed information. In addition, it will be recognized that skewing of non-redundant data may also be employed if desired. In addition, it will be recognized that non-display data may also be communicated over the link and may also be skewed and then de-skewed as described above. The delay as noted above, may be on the order of link symbol clocks, or any other suitable time frame.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A differential data transmission circuit comprising:
   a plurality of differential lane transmission circuits operative to provide at least one of redundant control symbols and redundant control data across respective differential lanes and operative to skew the at least one of respective redundant control symbols and the redundant control data in time across the plurality of differential lane transmission circuits.

2. The differential data transmission circuit of claim 1 comprising a lane skewing circuit comprised of a delay stage interposed in line prior to a per lane parallel to serial conversion stage in at least one of the plurality of differential lane transmission circuits with respect to an adjacent lane.

3. The differential data transmission circuit of claim 1 comprising a lane skewing circuit comprised of a first delay stage interposed in line in at least one of the plurality of differential lane transmission circuits and a second delay stage interposed in line in at least another of the plurality of differential lane transmission circuits wherein the first and second delay stages produce different delays of the redundant control symbols and the control data in time.

4. The differential data transmission circuit of claim 1 comprising a lane skewing circuit comprised of a programmable delay circuit operative to produce different delays of the redundant control symbols and the control data in time among adjacent lanes.

5. A differential receiving circuit comprising:
   a plurality of differential lane receiver circuits that receive at least one of redundant control symbols and redundant control data across respective differential lanes and operative to de-skew the at least one of respective redundant control symbols and the redundant control data in time across the plurality of differential lane receiver circuits.

6. The differential receiving circuit of claim 5 comprising a lane de-skewing circuit comprised of a delay stage interposed in line after a per lane serial to parallel conversion stage in at least one of the plurality of differential lane receiving circuits with respect to an adjacent lane.

7. The differential data receiver circuit of claim 5 comprising a lane de-skewing circuit comprised of a first delay stage interposed in line in at least one of the plurality of differential lane receiver circuits and a second delay stage interposed in line in at least another of the plurality of differential lane receiver circuits wherein the first and second delay stages produce different delays of the redundant control symbols and the control data in time.

8. The differential data receiver circuit of claim 5 comprising a lane de-skewing circuit comprised of a programmable delay circuit operative to produce different delays of the redundant control symbols and the control data in time among adjacent lanes.

9. The differential data receiver circuit of claim 5 comprising redundant information based error correction and recovery logic operative to produce pixel information for display based on the redundant control symbols and control data.

10. A differential data transmission circuit comprising:
    a video stream processing circuit operative to provide a video data stream for communication over a plurality of differential lane transmission circuits;

a data packing circuit operative to output video control symbols, control data and associated packets of video data for each of the plurality of differential lane transmission circuits;

a plurality of delay circuits each associated with a different differential lane transmission circuit and operative to skew redundant control symbols and redundant control data in time across the plurality of differential lane transmission circuits.

11. The differential data transmission circuit of claim 10 wherein the control symbols are comprised of data representing a last active pixel during a vertical display period and a first active pixel of a line during a vertical display period and wherein the control data comprises data representing whether a video stream is in a vertical display period or vertical blanking period, and whether a video stream is in an odd or even field for interlaced video.

12. A device comprising:
a display;
a differential receiving circuit comprising a plurality of differential lane receiver circuits that receive at least one of redundant control symbols and redundant control data across respective differential lanes and operative to de-skew the at least one of respective redundant control symbols and the redundant control data in time across the plurality of differential lane receiver circuits and also operative to receive video data packed with the redundant control symbols and the control data; and
video processing circuitry, operatively coupled to the display, and operative to generate pixels for display on the display from the video data packed with the redundant control symbols and the control data.

13. The device of claim 12 wherein the differential receiving circuit comprises a lane de-skewing circuit comprised of a delay stage interposed in line after a per lane serial to parallel conversion stage in at least one of the plurality of differential lane receiving circuits with respect to an adjacent lane.

14. The device of claim 12 wherein the differential receiving circuit comprises a lane de-skewing circuit comprised of a first delay stage interposed in line in at least one of the plurality of differential lane receiver circuits and a second delay stage interposed in line in at least another of the plurality of differential lane receiver circuits wherein the first and second delay stages produce different delays of the redundant control symbols and the control data in time.

15. The device of claim 12 wherein the differential receiving circuit comprises a lane de-skewing circuit comprised of a programmable delay circuit operative to produce different delays of the redundant control symbols and the redundant control data in time among adjacent lanes.

16. The device of claim 12 wherein the differential receiving circuit comprises redundant information based error correction and recovery logic operative to produce pixel information for display based on the redundant control symbols and control data.

17. A system comprising:
a first device comprising a plurality of differential lane transmission circuits operative to provide at least one of redundant control symbols and redundant control data across respective differential lanes and operative to skew the at least one of respective redundant control symbols and the redundant control data in time across the plurality of differential lane transmission circuits; and
a second device comprising a plurality of differential lane receiver circuits that receive the transmitted respective at least one of redundant control symbols and redundant control data over respective differential lanes and operative to de-skew the respective at least one of redundant control symbols and the redundant control data in time between the plurality of differential lane receiver circuits.

18. The system of claim 17 wherein the differential data transmission circuit comprises a lane skewing circuit comprised of a first delay stage interposed in line in at least one of the plurality of differential lane transmission circuits and a second delay stage interposed in line in at least another of the plurality of differential lane transmission circuits wherein the first and second delay stages produce different delays of the redundant control symbols and the control data in time.

19. A method for processing video comprising:
processing a video stream to produce at least one of control symbols, control data and video data; and
transmitting at least one of skewed redundant control symbols and redundant control data across respective differential lanes in time along with associated video data.

20. The method of claim 19 comprising
receiving the at least one of redundant control symbols and control data and associated video data over respective differential lanes; and
de-skewing the redundant control symbols and the control data in time.

21. The method of claim 20 comprising:
producing pixel information for display based on the redundant control symbols and control data; and
displaying pixels, on a display, that are based on the produced pixel information.

22. A data transmission circuit comprising:
a plurality of transmission circuits operative to provide at least same redundant control information across respective channels and operative to skew the respective same redundant control information in time between the plurality of transmission circuits.

23. The data transmission circuit of claim 22 comprising a channel skewing circuit comprised of a delay stage in at least one of the plurality of channel transmission circuits with respect to another channel.

24. The data transmission circuit of claim 22 comprising a channel skewing circuit comprised of a first delay stage interposed in line in at least one of the plurality of channel transmission circuits and a second delay stage interposed in line in at least another of the plurality of channel transmission circuits wherein the first and second delay stages produce different delays of redundant control information in time.

25. The data transmission circuit of claim 22 comprising a channel skewing circuit comprised of a programmable delay circuit operative to produce different delays of the redundant control information in time among channels.

26. A receiving circuit comprising:
a plurality of receiver circuits that receive same redundant control information across respective channels and operative to de-skew the same redundant control information in time across the plurality of receiver circuits.

27. The receiving circuit of claim 26 comprising a channel de-skewing circuit comprised of a delay stage in at least one of the plurality of receiving circuits with respect to another channel.

28. The receiving circuit of claim 27 comprising a lane de-skewing circuit comprised of a first delay stage interposed in line in at least one of the plurality of differential lane receiver circuits and a second delay stage interposed in line in at least another of the plurality of differential lane receiver circuits wherein the first and second delay stages produce different delays of the redundant control information in time.

29. The receiving circuit of claim 26 comprising a lane de-skewing circuit comprised of a programmable delay circuit operative to produce different delays of the redundant control information in time among channels.

30. The receiving circuit of claim 26 comprising redundant information based error correction and recovery logic operative to produce pixel information for display based on the redundant control information.

* * * * *